No. 856,329. PATENTED JUNE 11, 1907.
E. D. WOODS.
VEHICLE WHEEL.
APPLICATION FILED OCT. 30, 1905. RENEWED APR. 29, 1907.
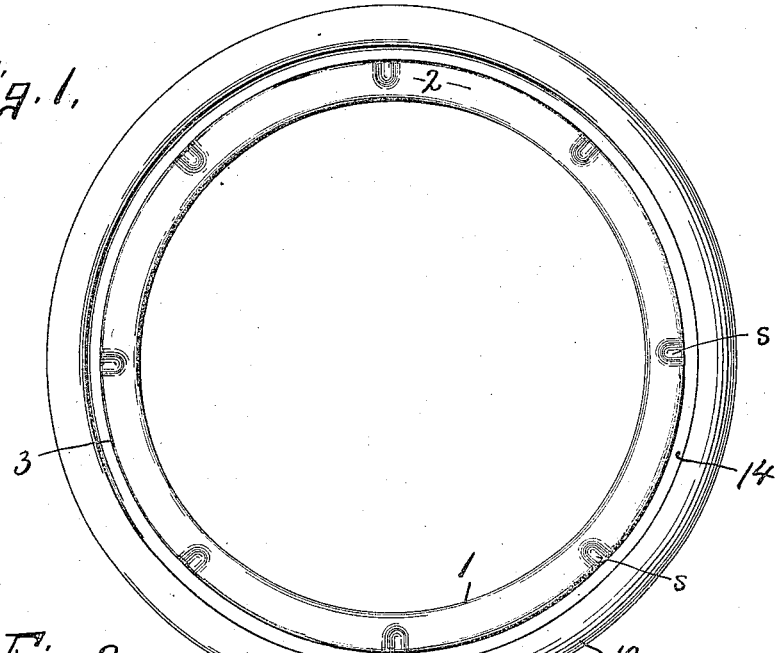
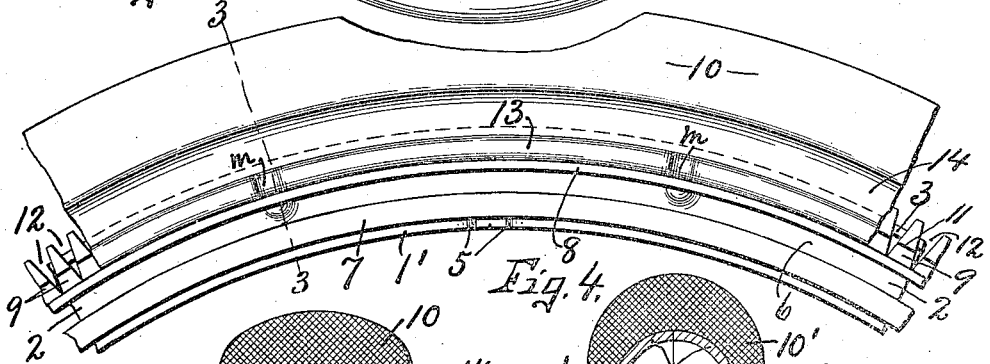
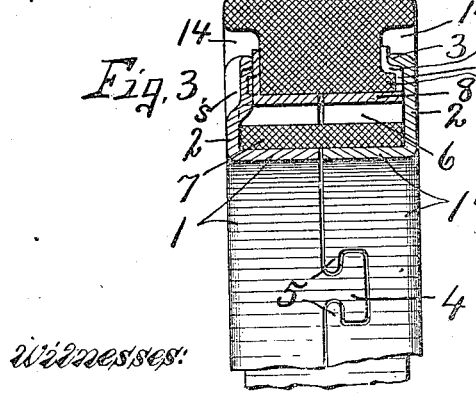
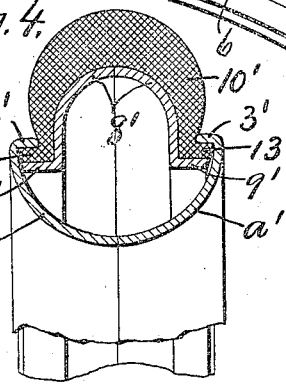

UNITED STATES PATENT OFFICE.

EDWARD DINSMORE WOODS, OF SYRACUSE, NEW YORK, ASSIGNOR OF ONE-THIRD TO HARRIET ADELL SLACK, OF WATERLOO, NEW YORK, ONE-THIRD TO WILLIAM A. HYLE, OF SYRACUSE, NEW YORK, AND ONE-THIRD TO EDWARD A. PAUL, OF NEW YORK, N. Y., AND CHRISTIAN ECKER, OF SYRACUSE, NEW YORK.

VEHICLE-WHEEL.

No. 856,329.     Specification of Letters Patent.     Patented June 11, 1907.

Application filed October 30, 1905. Renewed April 29, 1907. Serial No. 370,837.

To all whom it may concern:

Be it known that I, EDWARD DINSMORE WOODS, of Syracuse, in the county of Onondaga, in the State of New York, have invented new and useful Improvements in Vehicle-Wheels, of which the following, taken in connection with the accompanying drawings, is a full, clear, and exact description.

This invention relates to improvements in vehicle wheels and refers more particularly to the tire and its supporting rim or rims by which I am enabled to use a solid rubber or cushion tire and still obtain all the elasticity and other advantages of an ordinary pneumatic tire without any of its disadvantages, such as deflation by puncturing or bursting of the tube.

My object, therefore, is to mount a continuous solid tire of yielding material, such as rubber, upon a continuous circular hoop or band of spring metal which is fitted snugly within the tire and tensioned to maintain its circular form and is adapted to encircle the periphery of a suitable supporting rim leaving sufficient clearance between the spring-band and periphery of the rim which it encircles to allow for radial compression of the tire and its supporting spring due to the superimposed load or weight encountering obstructions in the roadway, the purpose being to give the spring-band sufficient resiliency to support a predetermined normal load and at the same time to yield and recover readily when passing over obstructions.

A further object is to provide suitable retaining flanges or rim sections with an annular buffer-band of rubber or equivalent material which receives the direct impact of the spring-band or hoop upon the radial compression of the tire and band when encountering abrupt obstacles in the roadway, so as to relieve in a measure the strain upon the hoop and at the same time to prevent a too sudden jar or strain upon the rim sections or felly of the wheel.

Other objects and uses incidental to the use of a solid rubber tire with my improved spring-band and rim sections will be brought out in the following description.

In the drawings,—Figure 1 is an end view of the rim and tire of my improved wheel. Fig. 2 is an enlarged elevation of a portion of the wheel seen in Fig. 1, with one of the rim sections removed showing the construction of the spring-band and tire together with the buffer and opposite rim section. Fig. 3 is a sectional view taken on line 3—3 of Fig. 2. Fig. 4 is a similar sectional view of a modified form of rim, spring-band and tire.

In carrying out the objects stated I provide two opposed circular rim sections —1— and —1'— with radially projecting circular flanges —2— having their outer edges bent inwardly toward each other forming annular shoulders —3—. These rim sections are preferably formed of comparatively thin sheet steel pressed to the desired form and have their inner sides provided with interlocking shoulders —4— and —5— to prevent independent circumferential movement of one of the rim sections relatively to the other.

The inner face of the circular rim sections —1— and —1'— seen in Figs. 1 to 3 inclusive, are comparatively flat transversely, and are adapted to rest upon and to be secured to the periphery of the felly of the wheel, not shown, so that when the shoulders —4— and —5— of the rim sections —1— and —1'— are locked together and placed upon the felly of the wheel they are prevented from disengagement or radial displacement one from the other, although when removed from the wheel these rim sections may be sprung radially sufficient to disengage these interlocking shoulders and permit the rim sections to be removed endwise one from the other.

The formation of the rim sections —1— and —1'— with radial circumferential flanges —2— produces an annular chamber or recess —6— in the periphery of the rim, and in the base of this recess upon the periphery of the inner flange of the rim sections —1— and —1'— is snugly fitted and seated a circular buffer-ring or band —7— and surrounding this buffer-ring but spaced apart some distance therefrom within the recess —6— is a circular band —8— of spring metal of somewhat greater diameter than the outer diameter of the buffer-ring —7— so as to leave an intervening space for the radial compression of said spring-band.

This spring metal hoop or band —8— has a close sliding fit within the circular flanges —2— of the rim sections —1— and —1'— and is itself provided with radial flanges —9— which extend outwardly from the edges of the band —8— between the annular shoulders —3— and adjacent sides of a rubber tire —10—. This tire —10— is preferably solid and is fitted snugly upon the periphery of the spring band —8—, by which the circular form of the tire is maintained and is normally pressed outwardly or expanded away from the buffer-band —7—, the annular flanges —9— being offset inwardly forming annular shoulders —11— which normally rest against the inner faces of the annular shoulders —3— of the rim sections —1— and —1'—.

The annular flanges —9— extend outwardly between the shoulders —3— and adjacent sides of the tire —10— and are formed with a series of recesses or V-shaped cut-outs —12— to allow for the radial compression of all portions of the band —8—.

By interposing the flange —9— between the shoulders —3— and adjacent foot of the tire —10— I provide a metal-wearing surface and thereby prevent undue abrasion of the tire, it being understood that the tire —10— and its supporting band —8— are permanently attached, said tire being provided at its inner edge with laterally projecting flanges —13—, which fit within the annular shoulders —11— and prevent any accidental displacement of the tire from said band.

The outer portion of the tire —10— is somewhat enlarged transversely so as to extend laterally over the flanges —3— and —9—, thus forming annular grooves —14— in opposite sides of the tire which are of sufficient radial depth to permit said tire, with its supporting band —8— to be compressed inwardly at any point a distance equal to the depth of the intervening space between the band —8— and buffer —7—.

In order to lock the tire and its supporting band —8— to the rim sections —1— and —1'— to prevent independent circumferential movement of said parts the flanges —13— of the tire are provided at intervals with cut-outs or recesses —m— and the flanges —9— and —2— are also depressed inwardly at the same intervals forming interlocking radial shoulders upon the flanges —2— and —9— which enter the recesses in the flanges —13— thereby locking the flanges —2— and —9— to each other and at the same time locking the inner flange —9— to the flange —13— of the tire —10—.

In assembling the parts of my invention seen in Figs. 1 to 3 inclusive, the tire —10— is first fitted upon the spring-band —8— between the flanges —9— with the radial shoulders of the said flanges —9— registered with the recesses in the tire-flange —13—. This tire with its supporting band —8— is then placed in operative position encircling one of the rim sections, as —1—, upon which the buffer —7— has been previously mounted, after which the other rim section, as —1'— is placed in operative position to inclose the buffer-band —7— and inner portion of the tire —10— and its supporting band —8—, the shoulders —4— and —5— of the rim sections being interlocked with each other by springing one of the parts radially a sufficient distance to clear the shoulder of the other part, and then bringing the parts —1— and —1'— together until the shoulders —4— and —5— interfit one with the other. The rim comprising the sections —1— and —1'— may then be secured in any desired manner, not necessary to herein illustrate or describe, to the felly or permanent rim of a wheel not shown, as the construction of the wheel and the manner of fastening my improved rim thereto is immaterial, so far as my present invention is concerned.

In Fig. 4 I have shown a modified form of sheet metal rim which is convexed inwardly transversely and is divided through its longitudinal center forming opposed rim sections —a— and —a'— having their outer edges offset inwardly forming annular shoulders —3'—. Surrounding the rim sections —a— and —a'— is an additional ring —8'— of spring metal which has its central portion arched transversely and outwardly for receiving and supporting a rubber tire or tread —10'—. The opposite inner edges of the spring ring —8'— are bent laterally and outwardly forming annular shoulders —9'— which lie within the annular shoulders —3'— and are supported a slight distance from the inner face of the rim sections —a— and —a'— to allow the spring ring to yield inwardly and radially at different points throughout its circumference when the tire is encountering obstructions or obstacles in the roadway. This tire —10'— also has its inner edges provided with outwardly projecting flanges —13'— which are interposed between the flanges —3'— and —9'—. The spring ring or band —8'— is of course less yielding than that seen in Fig. 3, but still has a slight radial action sufficient to form a cushion which recovers quickly after compression and at the same time removes in a measure the jar incidental to the sudden contact of the tire with an obstruction.

Having thus fully described my invention, what I claim and desire to secure by Letters Patent, is:

1. In a vehicle wheel a rim, a continuous circular two-part spring-band encircling and of greater diameter than the rim leaving an intervening space for the radial compression of all portions of the band flanges carried by said band, means carried by said flanges for locking the band against circumferential movement around the rim and an elastic tire applied to the periphery of the band.

2. In a vehicle wheel, a rim composed of circular sections arranged end to end, a two-part circular spring metal band encircling and of greater diameter than the periphery of the rim leaving an intervening annular space for radial action of all parts of the band, a circular elastic buffer-band interposed between the spring-band and periphery of the rim and an elastic tire applied to the periphery of the spring-metal band.

3. In a vehicle wheel, a rim composed of circular sections arranged end to end and interlocked with each other against independent movement, said rim sections having outturned flanges terminating in lateral annular shoulders, a two-part circular spring-band fitted between the flanges of the rim, but of greater diameter than the portion of the rim which it surrounds forming an intervening annular space for radial action of all the parts of the spring-band, said band extending beyond and within the adjacent edges of said annular shoulders and an elastic tire fitted upon the periphery of the band and having opposite annular shoulders interposed between the spring-band and annular shoulders of the rim sections.

4. In a vehicle wheel, a rim composed of circular sections arranged end to end, and interlocked with each other against independent movement, the tire having annular flanges, said flanges being provided at regular intervals with recesses, a two-part spring band of larger diameter than said rim sections and adapted to closely fit within the flanges of said rim sections, said spring band having upturned annular flanges, said flanges adapted to be engaged with the recesses in the flanges of the tire, and the flanges of the rim sections adapted to be engaged with the flanges of the spring-band at a point where the flanges of the spring band engage the recesses in the flanges of the tire, substantially as described.

In witness whereof I have hereunto set my hand on this 21st day of October, 1905.

EDWARD DINSMORE WOODS.

Witnesses:
H. E. CHASE,
HOWARD P. DENISON.